United States Patent
Akai et al.

(10) Patent No.: US 8,563,968 B2
(45) Date of Patent: Oct. 22, 2013

(54) ELECTROLUMINESCENT DEVICE

(75) Inventors: Tomonori Akai, Nagareyama (JP); Yasuhiro Iizumi, Setagaya-Ku (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 110 days.

(21) Appl. No.: 12/680,638

(22) PCT Filed: Sep. 26, 2008

(86) PCT No.: PCT/JP2008/067456
§ 371 (c)(1), (2), (4) Date: Mar. 29, 2010

(87) PCT Pub. No.: WO2009/041594
PCT Pub. Date: Apr. 2, 2009

(65) Prior Publication Data
US 2010/0258789 A1    Oct. 14, 2010

(30) Foreign Application Priority Data

Sep. 28, 2007 (JP) ................................ 2007-255579
Sep. 16, 2008 (JP) ................................ 2008-237063

(51) Int. Cl.
| H01L 29/08 | (2006.01) |
| H01L 35/24 | (2006.01) |
| H01L 51/00 | (2006.01) |
| H01L 27/15 | (2006.01) |
| H01L 29/26 | (2006.01) |
| H01L 31/12 | (2006.01) |
| H01L 33/00 | (2010.01) |

(52) U.S. Cl.
USPC 257/40; 257/79; 257/E51.026; 257/E51.018; 977/774

(58) Field of Classification Search
None
See application file for complete search history.

(56) References Cited

U.S. PATENT DOCUMENTS 8,142,969 B2 *   3/2012   Ezumi et al. .................... 430/66
2003/0003614 A1 *   1/2003   Andriessen .................... 438/22
(Continued)

FOREIGN PATENT DOCUMENTS

| JP | 10-110163 | 4/1998 |
| JP | 2005-502176 | 1/2005 |

(Continued)

OTHER PUBLICATIONS

Seth Coe, et al., "Electroluminescence from single monolayers of nanocrystals in molecular organic devices", Nature, vol. 420, Dec. 2002, pp. 800-803.

(Continued)

*Primary Examiner* — Fernando L Toledo
*Assistant Examiner* — Valerie N Newton
(74) *Attorney, Agent, or Firm* — Oblon, Spivak, McClelland, Maier & Neustadt, L.L.P.

(57) ABSTRACT

The present invention provides an EL device that contains a quantum-dots-containing layer in which quantum dots hardly coagulate even under high-temperature conditions, e.g., at a temperature of 90° C. or more, that has a good performance even if heat treatment was carried at a high temperature in its production process, that can retain its emission characteristics for a prolonged period of time, and that has high durability. An electroluminescent device comprises a pair of electrodes, and an electroluminescent layer containing at least a luminescent layer, situated between the electrodes. The luminescent layer contains quantum dots whose surfaces are protected by one or more protective materials. At least one of the protective materials has a glass transition temperature and a melting point of 90° C. or more.

16 Claims, 1 Drawing Sheet

(56) References Cited

U.S. PATENT DOCUMENTS

| | | |
|---|---|---|
| 2003/0042850 A1* | 3/2003 | Bertram et al. ............... 313/504 |
| 2003/0118927 A1* | 6/2003 | Nakamura et al. .............. 430/65 |
| 2006/0159951 A1 | 7/2006 | Falcou et al. |
| 2006/0175958 A1 | 8/2006 | Gerhard et al. |
| 2006/0176244 A1 | 8/2006 | Hori et al. |
| 2007/0077594 A1 | 4/2007 | Hikmet et al. |
| 2009/0109435 A1* | 4/2009 | Kahen et al. .................. 356/317 |

FOREIGN PATENT DOCUMENTS

| | | |
|---|---|---|
| JP | 2005 38634 | 2/2005 |
| JP | 2006-520077 | 8/2006 |
| JP | 2006 528421 | 12/2006 |
| JP | 2007 513478 | 5/2007 |
| WO | WO 03/021694 | 3/2003 |
| WO | WO 2004/081141 A1 | 9/2004 |
| WO | 2005 004548 | 1/2005 |

OTHER PUBLICATIONS

U.S. Appl. No. 12/680,418, filed Mar. 26, 2010, Akai, et al.
U.S. Appl. No. 12/680,036, filed May 5, 2010, Akai, et al.
U.S. Appl. No. 12/680,046, filed Mar. 25, 2010, Okada, et al.
U.S. Appl. No. 12/680,439, filed Mar. 26, 2010, Iizumi et al.

* cited by examiner

ELECTROLUMINESCENT DEVICE

BACKGROUND OF THE INVENTION

1. Field of the Invention

The present invention relates to an electroluminescent device (EL device).

2. Background Art

In electroluminescent devices (EL devices), which use electroluminescence, attention is now focused on their use as light-emitting devices in various types of displays, and so forth. EL devices are self-light-emitting devices of injection luminescence type, which use luminescence that occurs at the instance electrons and holes arriving at a luminescent layer recombine with each other. The basic structure of EL devices is that a luminescent layer containing a luminescent material is situated between a cathode and an anode. EL devices are classified into inorganic ones using inorganic compounds as the luminescent material and organic ones using organic compounds as the luminescent material.

Recently, electroluminescent devices using, as the luminescent material, quantum dots have also been proposed (e.g., Patent Documents 1 to 3, and Non-Patent Document 1). Quantum dots are nanometer-sized fine particles of a semiconductor (semiconductor nanocrystals). Owing to their quantum confinement effect (quantum size effect) with which electrons and excitons are confined in nanometer-sized small crystals, quantum dots exhibit characteristic optical and electrical properties, and their utilization is expected in a wide variety of technical fields. A quantum dot emits light having a wavelength dependent on its particle diameter, so that it is possible to obtain lights different in wavelength by controlling the particle diameter. Further, since light emitted by a quantum dot is narrow in spectral width, it is excellent in color purity.

Although a layer containing quantum dots can be formed by a wet process which dispersion of quantum dots is applied, or a dry process which a material for quantum dots is deposited to form a film by such a technique as vapor deposition or sputtering, there is a tendency to adopt a wet process from the viewpoint of simplicity of apparatus and process, smoothness of the layer formed, and so forth.

However, using a wet process to form a quantum-dots-containing layer is disadvantageous in that quantum dots easily coagulate in their dispersion. For the purpose of controlling the dispersibility of quantum dots in a liquid and also the particle diameter of quantum dots in their production, the surfaces of quantum dots are protected by a protective material. Typical examples of protective materials effective in controlling the particle diameter of quantum dots in their production and in improving the dispersibility of quantum dots in a liquid include trioctylphosphine oxide (TOPO: $[CH_3(CH_2)_7]_3PO$).

Organic EL devices have a shortcoming that their life is short whether organic compounds used as the luminescent material are low or high in molecular weight. The reason for this is as follows: an organic compound used as the luminescent material deteriorates and decomposes during heat treatment in the production of a device, or due to heat a driven device generates, or because of chemical changes caused by transport of charges, formation of excitons, or emission of light, resulting in changes in emission characteristics including chromaticity, mobility of electrons, that of holes, and exciton production efficiency. In order to suppress such irreversible changes in emission characteristics that are caused by the deterioration and decomposition of an organic compound, many studies have been made until now.

For example, Patent Document 4 describes an organic electroluminescent device comprising organic compound layers, in which all the organic compound layers have glass transition temperatures of 75° C. or more, and an organic compound layer that is in contact with an organic blue-luminescent layer has a glass transition temperature of 105° C. or more. An object of the technique described in this patent document is to solve the following problems in the prior art: since the glass transition temperatures of blue-light-emitting organic compounds contained in organic EL devices are low, the devices are poor in thermal stability, undergo change in luminescent color, and deteriorate in luminous efficiency. Patent Document 4 describes that it is possible to solve these problems by using organic compound layers having glass transition temperatures of 75° C. or more to produce an organic EL device.

Patent Document 1: Japanese Laid-Open Patent Publication No. 2005-38634

Patent Document 2: Published Japanese Translation of PCT International Publication for Patent Application No. 2005-502176

Patent Document 3: Published Japanese Translation of PCT International Publication for Patent Application No. 2006-520077

Patent Document 4: Japanese Laid-Open Patent Publication No. 1998-110163

Non-Patent Document 1: Seth Coe et al., *Nature* 420, 800-803 (2002)

On the other hand, quantum dots, which are made from inorganic compounds, hardly deteriorate even under high-temperature conditions, e.g., at a temperature of 75° C., and thus retain their emission characteristics such as luminescent color and luminous efficiency. However, we found the following: organic compounds, such as a material for protecting quantum dots and a binder component of a quantum-dots-containing luminescent layer, soften in the production or high-temperature storage of a device, or due to heat a driven device generates; this increases the mobility of the quantum dots in the luminescent layer to accelerate coagulation of the quantum dots.

Specifically, when dispersion of quantum dots is used to form a quantum-dots-containing luminescent layer (wet process), a solvent remaining in the film formed by the dispersion is an impurity for the luminescent layer, so that it is desirable to remove the remaining solvent by fully drying the film formed. This is because, if the solvent is remaining in the luminescent layer, there is the possibility that the device may deteriorate in driving stability (half-life of luminance).

The solvent to be used for dispersing therein quantum dots is selected depending upon the solubility of materials for the quantum-dots-containing luminescent layer, a technique to be used to apply the quantum dot dispersion, and others. For example, cyclohexane, toluene, xylene, anisole, mesitylene, tetralin, or cyclohexyl benzene can be used as the solvent; the boiling points of these solvents are 81° C., 111° C., 139° C., 155° C., 165° C., 208° C., and 240° C., respectively. To remove these solvents fully from the luminescent layer by drying, it is desirable to heat the film of the quantum-dots-dispersed liquid to temperatures above their boiling points. Therefore, in the case where any of the above solvents is used, it is necessary to dry the film at a temperature of 81° C. or more, even if cyclohexane, which has the lowest boiling point among the above solvents, is used.

If the material for protecting the quantum dots has a glass transition temperature and a melting point of less than 81° C., it softens in the step of drying its film. This increases the mobility of the quantum dots, accelerating coagulation of the quantum dots.

A solvent having a boiling point lower than that of cyclohexane (less than 81° C.) can also be used as the solvent in which quantum dots are dispersed. However, if such a low-boiling-point solvent is used, it is difficult to ensure the coating stability of the quantum dot dispersion in the step of applying the dispersion (by ink-jet printing, for example), which makes it difficult to control the thickness, pattern, etc. of the luminescent layer.

Conventional quantum-dot-protecting materials represented by TOPO have low glass transition temperatures (Tg) and melting points, so that they soften when heated in the production process of an EL device as described above, or during storage of a device, or due to heat a driven device generates. This increases the mobility of the quantum dots, accelerating coagulation of the quantum dots.

A quantum dot emits light whose color is dependent on its size, as is described above. Therefore, if the quantum dots coagulate in the quantum-dots-containing luminescent layer and thus undergo change in crystalline structure, the luminescent color changes, and, moreover, quenching occurs. This is one of the major causes for deterioration of EL devices in emission characteristics. Furthermore, coagulation of the quantum dots causes phase separation in the luminescent layer, which leads to non-uniform light emission; it also changes the mobility of electrons and holes in the luminescent layer and decreases the efficiency of exciton production, which leads to decrease in luminous efficiency. Namely, coagulation of the quantum dots in the luminescent layer that occurs in the production process or storage of an EL device, or due to heat a driven device generates, hinders the prolongation of EL device life, when viewed from the stability of emission characteristic of the luminescent layer.

SUMMARY OF THE INVENTION

The present invention was accomplished in the light of the above circumstances. An object of the present invention is to provide a highly durable EL device that can retain its emission characteristics for a prolonged period of time because quantum dots in its luminescent layer hardly coagulate even under high-temperature conditions, e.g., at a temperature of 90° C. or more.

An EL device of the present invention comprises a pair of electrodes, and an electroluminescent layer containing at least a luminescent layer, situated between the electrodes, the luminescent layer containing quantum dots whose surfaces are protected by one or more protective materials, at least one of the protective materials having a glass transition temperature and a melting point of 90° C. or more.

In the EL device of the present invention, the quantum dots hardly coagulate because a compound whose glass transition temperature and melting point are 90° C. or more is used as the protective material for protecting the quantum dots, so that the protective material does not soften even under high-temperature conditions, e.g., at a temperature of 90° C. or more. Therefore, the present invention can solve the problem that quantum dots coagulate in the production process of an EL device, or in an EL device in storage or operation, and thus can provide an EL device capable of retaining its emission characteristics for a long period of time, attaining prolongation of device life.

For preventing coagulation of the quantum dots in the luminescent layer with higher certainty, it is preferred that the glass transition temperature and melting point of the protective material be 130° C. or more.

Examples of the protective material include compounds having in one molecule one or more hydrophilic residues and a hydrophobic group, the hydrophobic group containing a residue of at least one compound selected from triphenylamine derivatives, arylamine derivatives, oxadiazole derivatives, dinaphthylanthracene derivatives, distyrylarylene derivatives, carbazole derivatives, benzimidazole derivatives, and aluminum quinolinol complex derivatives.

Specific examples of the protective material include compounds having, as the hydrophobic group, a residue of at least one compound selected from 4,4',4''-tris[2-naphthyl(phenyl)amino]triphenylamine, 4,4',4''-tri[N-carbazoleyl]triphenylamine, bis(N-(1-naphthyl-N-phenyl)benzidine), 1,3-bis[2-(2,2'-bipyridine-6-yl)-1,3,4-oxadizao-5-yl]benzene, 3-tert-butyl-9,10-di(naphth-2-yl)anthracene, 2,2',7,7'-tetrakis(2,2'-diphenylvinyl)spiro-9,9'-bifluorene, 1,3-bis(carbazole-9-yl)benzene, 4,4'-bis(9-carbazoleyl)-2,2'-dimethyl-biphenyl, 4,4'-bis(carbazole-9-yl)-9,9-dimethyl-fluorene, 4,4'-bis(carbazole-9-yl)-9,9-ditoluyl-fluorene, 2,7-bis(9-carbazoleyl)-9,9-spirobifluorene, 2,2',2''-(1,3,5-benzenetriyl)-tris(1-phenyl-1-H-benzimidazole), tris(8-quinolinol)aluminum complexes, and bis(2-methyl-8-quinolate)(p-phenylphenolate)aluminum complexes.

Preferably, the luminescent layer further contains at least one binder component whose glass transition temperature and melting point are 90° C. or more. This is because if a compound whose glass transition temperature and melting point are 90° C. or more is used as the binder component, the binder component hardly softens even under high-temperature conditions, which makes it possible to prevent coagulation of the quantum dots with higher certainty.

Further, when all the components of the luminescent layer have glass transition temperatures and melting points of 90° C. or more, the mobility of the quantum dots in the luminescent layer hardly increases in the driven EL device, which makes it possible to prevent coagulation of the quantum dots with much higher certainty.

In the EL device of the present invention, the quantum dots, luminescent material, hardly coagulate even under high-temperature conditions, e.g., at a temperature of 90° C. The present invention can thus provide a highly durable EL device capable of retaining its emission characteristics for a prolonged period of time.

BEST MODE FOR CARRYING OUT THE INVENTION

Figure 1:
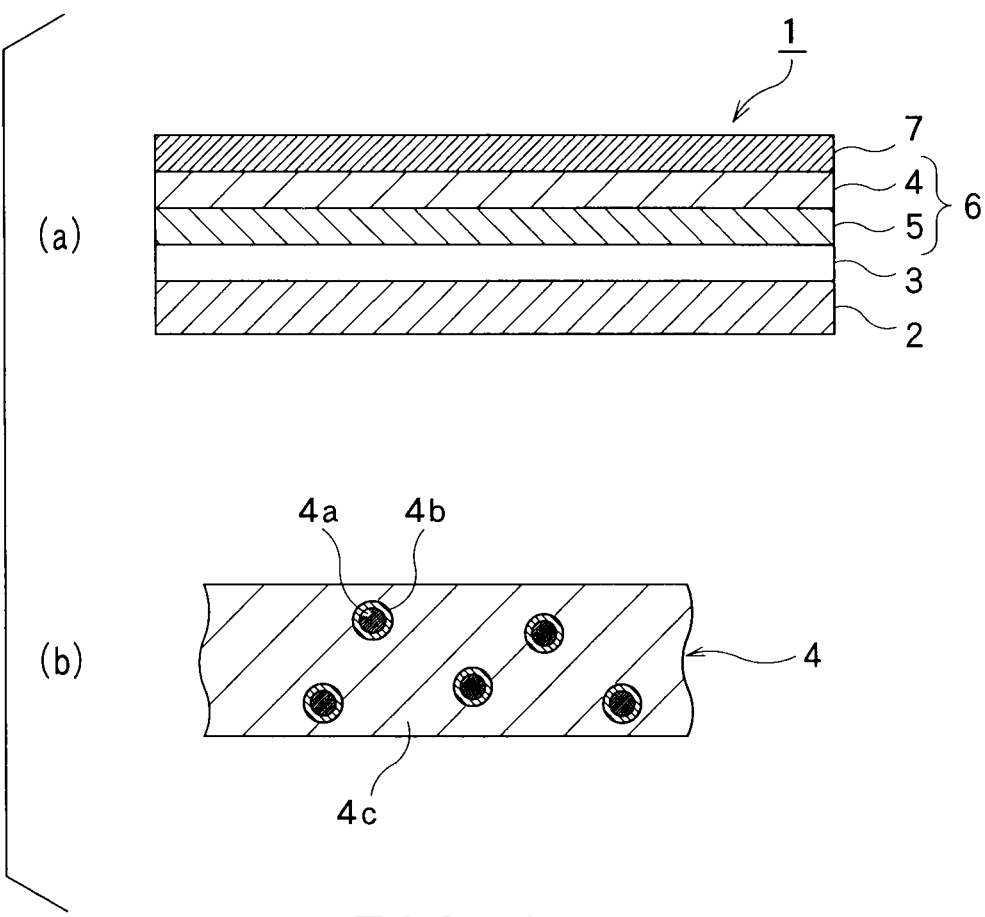
FIG. 1(a) is a schematic cross-sectional view showing an embodiment of the EL device of the present invention.
FIG. 1(b) is a view showing a luminescent layer.

An EL device of the present invention comprises a pair of electrodes, and an electroluminescent layer (EL layer) containing at least a luminescent layer, situated between the electrodes, the luminescent layer containing quantum dots whose surfaces are protected by one or more protective materials, at least one of the protective materials having a glass transition temperature and a melting point of 90° C. or more.

The EL device of the present invention uses quantum dots as a luminescent material. Since the wavelength of light emitted by a quantum dot is dependent on the size of a fine particle of the quantum dot crystal because of the quantum size effect, it is possible to obtain lights different in wavelength by controlling the size of the fine particle. On the other hand, if quantum dots coagulate, the crystalline structure changes, which may lead to change in luminescent color or quenching. Furthermore, coagulation of quantum dots in a quantum-dot-containing luminescent layer causes phase separation in the luminescent layer to bring about non-uniformity in light emission. It also changes the mobility of electrons and holes in the luminescent layer and decreases the efficiency of exciton production, which leads to decrease in luminous efficiency.

To solve the above problems, the present invention uses a protective material whose glass transition temperature and melting point are 90° C. or more (hereinafter sometimes referred to as a heat-resistant protective material) to protect the surfaces of the quantum dots to be incorporated in the luminescent layer as a luminescent material. Such a protective material hardly softens even under high-temperature conditions, e.g., at a temperature of 90° C. or more, which makes it possible to prevent coagulation of the quantum dots that occurs due to softening of the protective material. Namely, in a conventional EL device using quantum dots protected by a protective material whose glass transition temperature and melting point are low, the protective material softens under high-temperature conditions to increase the mobility of the quantum dots, which leads to coagulation of the quantum dots. Even under such high-temperature conditions, the quantum dots contained in the EL device of the invention hardly coagulate and can remain in their state of dispersion.

Thus the present invention can solve the problem that the luminescent color of quantum dots changes or quenching occurs due to coagulation of quantum dots. The present invention can also solve the problems that non-uniform emission occurs due to phase separation caused in a luminescent layer by coagulation of quantum dots, and that luminous efficiency decreases because of change in the mobility of electrons and holes in a luminescent layer or decrease in the efficiency of exciton formation that occurs due to coagulation of quantum dot. Namely, the EL device of the present invention can retain its emission characteristics for a prolonged period of time and is excellent in durability.

Any quantum dots can be used in the present invention, as long as they are nanometer-sized fine particles of a semiconductor (semiconductor nano-crystals) and are made up of a luminescent material having the quantum confinement effect (quantum size effect). Specifically, semiconductor compounds of Groups II-VI, such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe; semiconductor compounds of Groups III-V, such as AlN, AlP, AlAs, AlSb, GaAs, GaP, GaN, GaSb, InN, InAs, InP, InSb, TiN, TiP, TiAs, and TiSb; semiconductor crystals containing semiconductors of Group IV such as Si, Ge, and Pb; and semiconductor compounds containing three or more elements, such as InGaP. It is also possible to use semiconductor crystals obtained by doping the above-described semiconductor compounds with rare earth or transition metal cations such as $Eu^{3+}$, $Tb^{3+}$, $Ag^{+}$, and $Cu^{+}$.

Of the above semiconductor compounds, semiconductor crystals of CdS, CdSe, CdTe, InGaP, etc. are preferred from the viewpoint of ease of preparation, control of particle diameter for emission of light in the visible range, and fluorescent quantum yield.

The quantum dot may consist of either one semiconductor compound or two or more semiconductor compounds. For example, the quantum dot may have a core-shell structure composed of a core made from a semiconductor compound and a shell made from a semiconductor compound different from the one for the core. A core-shell-type quantum dot can have increased luminous efficiency, if a semiconductor compound having a band gap greater than that of a semiconductor compound for the core is used for the shell. Examples of the core-shell structure composed of semiconductor compounds having band gaps in the above relationship include CdSe/ZnS, CdSe/ZnSe, CdSe/CdS, and CdTe/CdS (core/shell).

The size of the quantum dot may be determined depending on the materials for the quantum dot so that light having the desired wavelength can be obtained. A quantum dot has a greater energy band gap when its particle diameter is smaller. Namely, as the crystal size decreases, the light that the quantum dot emits shifts to the blue side, that is, the high-energy side. It is therefore possible to control the emission wavelength over the spectral ranges of ultraviolet, visible, and infrared by changing the quantum dot size Generally, it is preferred that the particle diameters of the quantum dots be in the range of 0.5 to 20 nm, particularly in the range of 1 to 10 nm. When the size distribution of the quantum dots is smaller, clearer luminescent color can be obtained.

The quantum dot may be in any shape; it may be in the shape of a sphere, a rod, or a disc, or in other shape. When the quantum dot is non-spherical, the diameter of a sphere having the same volume as the non-spherical quantum dot is taken as the particle diameter of the non-spherical quantum dot.

Information about the particle diameter, shape, and state of dispersion of the quantum dots can be obtained with the use of a transmission electron microscope (TEM). The crystalline structure and particle diameter of the quantum dots can be known from a powder X-ray diffraction (XRD) pattern. It is also possible to obtain information about the particle diameter and surface of the quantum dots from UV-Vis absorption spectrum.

In the present invention, the quantum dots in the state of being protected by the protective material attached to their surfaces are incorporated in the luminescent layer. It is the characteristic feature of the present invention that a compound whose glass transition temperature and melting point are 90° C. or more is used as the protective material.

The quantum dots being protected by the protective material means that the protective material is attached to the surfaces of the quantum dots. That the protective material is attached to the surfaces of the quantum dots include that the protective material is attached to the quantum dot surfaces by coordinate bond, and that the protective material is present on the quantum dot surfaces due to interaction (attraction force) between the quantum dot surfaces and the protective material. It is not necessary that the quantum dot surfaces be entirely covered with the protective material; partially exposed quantum dots are also useful.

It is possible to confirm that the protective material is attached to the surfaces of the quantum dots by confirming the presence of the elements making up the protective material with the use of X-ray photoelectron spectroscopy (XPS), one of the techniques for surface analysis.

As long as at least one protective material (hereinafter sometimes simply referred to as heat-resistant protective material) is attached to the surfaces of the quantum dots, two or more heat-resistant protective materials whose glass transition temperatures and melting points are 90° C. or more may be attached to the surfaces of the quantum dots, or a protective material other than the heat-resistant one may also be attached to the quantum dot surfaces.

Any material can be used as the heat-resistant protective material, as long as it has a glass transition temperature and a melting point of 90° C. or more and can attach to the surfaces of the quantum dots to prevent coagulation of the quantum dots. It is however preferable to use, as the heat-resistant protective material, a material whose glass transition temperature and melting point are 110° C. or more, more preferably 130° C. or more, because such a material can prevent coagulation of the quantum dots with higher certainty. On the other hand, from the viewpoint of solubility in solvents, it is usually preferred that the glass transition temperature and melting point of the heat-resistant protective material be 200° C. or less.

The following techniques, for example, can be used to determine the glass transition temperature and melting point of the protective material: TMA that the thermal expansion of a sample in thickness is measured with an instrument for thermal analysis while gradually increasing or decreasing the temperature of the sample; DSC that the amount of the heat generated or absorbed by a sample is measured with a differential scanning calorimeter while gradually increasing or decreasing the temperature of the sample; and DMA (tensile method) that the kinetic elasticity and loss tangent of a specimen are measured with a viscoelastometer while gradually increasing or decreasing the temperature of the specimen.

Examples of the heat-resistant protective material include organic compounds having in one molecule one or more hydrophilic residues and a hydrophobic group. Such organic compounds having in one molecule both hydrophilic and hydrophobic groups (hereinafter sometimes referred to as hydrophilic-group-containing protective materials) can attach to the surfaces of the quantum dots through the hydrophilic group because the hydrophilic group is compatible with the metals making up the quantum dots. The hydrophilic-group-containing protective material is preferably an organic compound having a hydrophobic group to which a hydrophilic group is bonded at its one or both ends.

In the hydrophilic-group-containing protective material, the hydrophilic group may be any functional group that can attach to the quantum dot surfaces. Examples of such functional groups include carboxyl group, amino group, hydroxyl group, thiol group, aldehyde group, sulfonic acid group, amide group, sulfonamide group, phosphoric acid group, phosphine group, and phosphine oxide group. It is particularly preferred that the hydrophilic group be one selected from carboxyl group, amino group, hydroxyl group, and phosphine oxide group because these groups are highly compatible with the quantum dots.

It is held that the glass transition temperature and melting point of the hydrophilic-group-containing protective material vary depending chiefly on the hydrophobic group, which has a high molecular weight and is the main component of the protective material. It is therefore considered that by selecting a hydrophobic group having such a structure that the hydrophilic-group-containing protective material can have a glass transition temperature and a melting point of 90° C. or more, it is possible to obtain a heat-resistant protective material whose glass transition temperature and melting point are 90° C. or more.

Examples of such heat-resistant hydrophobic groups include groups having rigid molecular structures, groups having steric hindrance, and groups composed of a large number of molecules; specifically, aromatic-group-containing groups and polymeric groups thereof. More specific examples of these heat-resistant hydrophobic groups include groups containing aromatic groups such as phenyl, naphthyl, pyridyl, and pyrrole groups, which may have substituents (such a structure that these aromatic rings are, for example, combined or condensed being included).

To ensure the conductivity of the luminescent layer, it is preferred that the protective material be charge-transportable. Examples of hydrophobic groups having the property of transporting charges will be enumerated below; such groups are residues of compounds useful as so-called host materials in luminescent layers in organic EL devices and residues of derivatives of these compounds.

Specific examples of hydrophobic groups having the property of transporting charges include residues of tetraphenylbutadiene derivatives, triphenylamine derivatives, arylamine derivatives, oxadiazole derivatives, pyrazoloquinoline derivatives, distyrylbenzene derivatives, distyrylpyrazine derivatives, distyrylarylene derivatives, silole derivatives, carbazole derivatives, anthracene derivatives, dinaphthylanthracene derivatives, phenylanthracene derivatives, thiophene cyclic compounds, pyridine cyclic compounds, perinone derivatives, perylene derivatives, oligothiophene derivatives, trifumanylamine derivatives, coumarin derivatives, oxadiazole dimers, pyrazoline dimers, phenanthrolines, and benzimidazole derivatives. Residues of compounds obtained by introducing fluorene or spiro group to the above-enumerated compounds are herein useful as well.

Specific examples of triphenylamine derivatives include 4,4',4"-tris[2-naphthyl(phenyl)amino]triphenylamine (2-TNATA: Tg=110° C., melting point=above 110° C.) and 4,4',4"-tri[N-carbazoleyl]triphenylamine (TCTA: Tg=151° C., melting point=above 151° C.). Specific examples of arylamine derivatives include bis(N-(1-naphthyl-N-phenyl)benzidine) (α-NPD: Tg=95° C., melting point=above 95° C.).

Specific examples of oxadiazole derivatives include 1,3-bis[2-(2,2'-bipyridin-6-yl)-1,3,4-oxadizao-5-yl]benzene (Bpy-OXD: Tg=102° C., melting point=above 102° C.). Specific examples of dinaphthylanthracene derivatives include 3-tert-butyl-9,10-di(naphth-2-yl)anthracene (TBADN: Tg=130° C., melting point=above 130° C.).

Examples of distyrylarylene derivatives include 2,2',7,7'-tetrakis(2,2'-diphenylvinyl)spiro-9,9'-bifluorene (spiro-DPVBi: Tg=130° C., melting point=above 130° C.).

Specific examples of carbazole derivatives include 4,4'-bis(9-carbazoleyl)-2,2'-dimethyl-biphenyl (CDBP: Tg=111° C., melting point=above 111° C.), 1,3-bis(carbazole-9-yl)benzene (MCP: Tg=90° C., melting point=above 90° C.), 4,4'-bis(carbazole-9-yl)-9,9-dimethyl-fluorene (DMFL-CBP: Tg=131° C., melting point=above 131° C.), 4,4'-bis(carbazole-9-yl)-9,9-ditoluyl-fluorene (DPFL-CBP: Tg=158° C., melting point=above 158° C.), and 2,7-bis(9-carbazoleyl)-9,9-spirobifluorene (Spiro-2CBP: Tg=174° C., melting point=above 174° C.).

Specific examples of benzimidazole derivatives include 2,2',2"-(1,3,5-benzenetriyl)-tris(1-phenyl-1-H-benzimidazole) (TPBi: Tg=above 122° C., melting point=above 122° C.).

The hydrophobic group may also be residues of such metallic complexes as aluminum quinolinol complexes, benzoquinolinol beryllium complexes, benzoxazole zinc complexes, benzothiazole zinc complexes, azomethyl zinc complexes, porphyrin zinc complexes, europium complexes, iridium metallic complexes, platinum metallic complexes, and metallic complexes having, as a center metal, such a metal as Al, Zn, Be, Ir or Pt, or such a rare earth metal as Tb, Eu or Dy, and, as a ligand, oxadiazole, thiadiazole, phenylpyridine, phenylbenzimidazole, quinoline structure, or the like.

Specific examples of aluminum quinolinol complexes include tris(8-quinolinol)aluminum complexes (Alq$_3$: Tg=about 183° C., melting point=above 183° C.) and bis(2- methyl-8-quinolate)(p-phenylphenolate)aluminum complexes (BAlq: Tg=above 90° C., melting point=above 90° C.).

The hydrophobic group may also be residues of such polymer compounds as polyparaphenylenevinylene derivatives, polythiophene derivatives, polyparaphenylene derivatives, polysilane derivatives, polyacetylene derivatives, polyvinylcarbazole, polyfluorenone derivatives, polyfluorene derivatives, polyquinoxaline derivatives, polydialkylfluorene derivatives, and copolymers of these derivatives. Furthermore, the hydrophobic group may also be compounds produced by polymerizing the above-enumerated compounds.

Particularly preferred hydrophilic-group-containing protective materials are ones having, as the hydrophobic group, a residue of at least one compound selected from 4,4',4"-tris[2-naphthyl(phenyl)amino]-triphenylamine, 4,4',4"-tri[N-carbazoleyl]triphenylamine, bis(N-(1-naphthyl-N-phenyl)benzidine), 1,3-bis[2-(2,2'-bipyridine-6-yl)-1,3,4-oxadiazo-5-yl]benzene, 3-tert-butyl-9,10-di(naphth-2-yl)anthracene, 2,2',7,7'-tetrakis(2,2'-diphenylvinyl)spiro-9,9'-bifluorene, 1,3-bis-(carbazole-9-yl)benzene, 4,4'-bis(9-carbazoleyl)-2,2'-dimethyl-biphenyl, 4,4'-bis(carbazole-9-yl)-9,9-dimethylfluorene, 4,4'-bis(carbazole-9-yl)-9,9-ditoluyl-fluorene, 2,7-bis(9-carbazoleyl)-9,9-spirobifluorene, 2,2',2"-(1,3,5-benzenetriyl)-tris(1-phenyl-1-H-benzimidazole), tris(8-quinolinol)-aluminum complexes, bis(2-methyl-8-quinolate)(p-phenylphenolate)-aluminum complexes, and derivatives of these compounds.

Further, in the present invention, a protective material having, in one molecule, one or more hydrophilic residues and a hydrophobic group, the hydrophobic group being a residue of any of the following organic compounds, may be attached to the surfaces of the quantum dots.

Namely, an organic compound having, as the hydrophobic group, a residue of the following so-called dopant that is fluorescent or phosphorescent may be attached to the surfaces of the quantum dots. Examples of residues of fluorescent dopants useful herein include residues of perylene derivatives, coumarin derivatives, rubrene derivatives, quinacridone derivatives, squalium derivatives, porphyrin derivatives, styryl colorants, tetracene derivatives, pyrazoline derivatives, decacyclene, phenoxazone, quinoxaline derivatives, carbazole derivatives, and fluorene derivatives. Specific examples of the above residues include residues of 2,5,8,11-tetra-tert-butylperylene (TBPe), coumarin 6, Nile Red, and 1,1,4,4-tetraphenyl-1,3-butadiene (TPB).

Furthermore, an organic compound, a phosphorescent dopant, having at its center an ion of a heavy metal such as white gold or iridium, and as the hydrophobic group a residue of a phosphorescent organometallic complex can also be used as the protective material. Specific examples of such residues include residues of Ir(ppy)$_3$, (ppy)$_2$Ir(acac), Ir(BQ)$_3$, (BQ)$_2$Ir(acac), Ir(THP)$_3$, (THP)$_2$Ir(acac), Ir(BO)$_3$, (BO)$_2$(acac), Ir(BT)$_3$, (BT)$_2$Ir(acac), Ir(BTP)$_3$, (BTP)$_2$Ir(acac), FIr$_6$, and PtOEP.

Of the residues of the above dopants, ones having glass transition temperatures and melting points of 90° C. or more can also be used as the hydrophobic group in the above-described heat-resistant protective material.

To the surfaces of the quantum dots may be attached any amount of the heat-resistant protective material, as long as the desired effect of the protective material can be obtained. The suitable amount of the protective material to be attached to the quantum dot surfaces varies depending on the type of the material for the quantum dots and that of the protective material. In the case where only the heat-resistant protective material is used as the protective material for protecting the quantum dots, it is preferred that the surfaces of the quantum dots be covered with the heat-resistant protective material in the state of closest packing. If the heat-resistant protective material is used together with other protective materials, it is preferred that the quantum dot surfaces be covered with all the protective materials in the state of closest packing.

Any process can be employed to produce the quantum dots protected by the above-described protective material. A liquid phase process which quantum dot crystals are made to grow in a liquid phase is preferred because of ease of introduction of the protective material to the quantum dot surfaces, controllability of the particle diameter of the quantum dots, simplicity of the production process, and so forth. Examples of liquid phase processes useful herein include the co-precipitation process, the reverse micelle process, and the hot soap process; the hot soap process is particularly preferred.

The hot soap process is as follows: at least one precursor of the desired quantum dots is thermally decomposed in a dispersant heated to a high temperature to cause reaction, and by this reaction, nucleation and crystal growth are made to proceed. For the purpose of regulating the rate of the reaction in the process of nucleation and crystal growth, a dispersant capable of coordinating to the constituent elements of the desired quantum dots is used as an essential component of the liquid phase medium. The hot soap process can provide quantum dots with a narrow particle diameter distribution, highly dispersible in a solution.

A method for producing the quantum dots with the use of the hot soap process will be described below in detail.

Any precursor can be used to produce the quantum dots, as long as it can form quantum dots containing the semiconductor compounds described above. For example, to produce quantum dots containing the semiconductor compounds of Groups II-VI or III-V described above, it is possible to use compounds that can serve as the source of the constituent atoms of the semiconductor compounds, e.g., combinations of (1) inorganic or organometallic compounds containing elements of Group II and/or Group III, or metal elements of Group II and/or Group III, and (2) compounds containing elements of Group VI and/or Group V, capable of reacting with the compounds or metal elements (1) to give the semiconductor compounds; and compounds containing elements of Group II and/or Group III and those of Group VI and/or Group V.

Specific examples of the above compounds (2) include bis(trimethylsilyl)selenide [(TMS)$_2$Se]; trialkylphosphine selenides such as (tri-n-octylphosphine)selenide [TOPSe] and (tri-n-butylphosphine)-selenide [TBPSe]; trialkylphosphine tellurides such as (tri-n-octylphosphine)telluride [TOPTe] and hexapropylphosphorus triamide telluride [HPPTTe]; bis(trimethylsilyl)telluride [(TMS)$_2$Te]; bis(trimethylsilyl)sulfide [(TMS)$_2$S]; trialkylphosphinesulfides such as (tri-n-octylphosphine)sulfide [TOPS]; ammonium salts such as ammonium halides (e.g., NH$_4$Cl); tris(trimethylsilyl) phosphide [(TMS)$_3$P); tris(trimethylsilyl)arsenide [(TMS)$_3$As]; and tris(trimethylsilyl)antimonide [(TMS)$_3$Sb].

It is preferred that the precursor of the quantum dots be soluble in a liquid phase containing the dispersant. Examples of solvents useful for the liquid phase include alkanes such as n-hexane, n-heptane, n-octane, isooctane, nonane, and decane; aromatic hydrocarbons such as benzene, toluene, xylene, and naphthalene; ethers such as diphenyl ether and di(n-octyl)ether; halogen-containing hydrocarbons such as chloroform, dichloromethane, dichloroethane, monochlorobenzene, and dichlorobenzene; amines such as n-hexylamine, n-octylamine, tri(n-hexyl)amine, and tri(n-octyl)amine; and the following compounds useful for the dispersant. Of these solvents, alkanes such as n-hexane, n-heptane, n-octane, and isooctane; trialkylphosphines such as tribuylphosphine, trihexylphosphine, and trioctylphosphine; and ethers are preferred.

Any material can be used as the dispersant, as long as it stabilizes by coordinating to fine crystals of the quantum dots in a liquid phase at a high temperature. Examples of such materials include trialkylphosphines such as tributylphosphine, trihexylphosphine, and trioctylphosphine; organophosphorus compounds such as tributylphosphine oxide, trihexylphosphine oxide, trioctylphosphine oxide (TOPO), and tridecylphosphine oxide; ω-aminoalkanes such as octylamine, decylalmine, dodecylamine, tetradecylamine, hexadecylamine, and octadecylamine; tertiary amines such as tri (n-hexyl)amine and tri(n-octyl)amine; organic nitrogen compounds such as nitrogen-containing aromatic compounds including pyridine, rutidine, collidine, and quinolines; dialkylsulfides such as dibutylsulfide; dialkylsulfoxides such as dimethylsulfoxide and dibutylsulfoxide; organic sulfur compounds such as sulfur-containing aromatic compounds including thiophene; higher fatty acids such as palmitic acid, stearic acid, and oleic acid; and 1-adamantane carboxylic acid.

Of the above-enumerated compounds, preferred for the dispersant are the following ones: compounds containing in their molecular structure nitrogen or phosphorus atom, e.g., trialkylphosphines such as tributylphosphine and trioctylphosphine; trialkylphosphine oxides such as tributylphosphine oxide and trioctylphosphine oxide (TOPO); and ω-aminoalkanes having 12 or more carbon atoms, such as dodecylamine, hexadecylamine, and octadecylamine.

More preferred for the dispersant are compounds that have carbon-phosphorus single bond, such as trialkylphosphines, e.g., tributylphosphine and trioctylphosphine, and trialkylphosphine oxides, e.g., tributylphosphine oxide and trioctylphosphine oxide. Trialkylphosphine oxides such as trioctylphosphine oxide are particularly preferred.

The above dispersants can be used singly. Alternatively, a mixture of two or more dispersants selected as needed from the above ones may be used.

The dispersant may be diluted with a suitable organic solvent (e.g., an aromatic hydrocarbon such as toluene, xylene, or naphthalene; a long-chain alkane such as octane, decane, dodecane, or octadecane; an ether such as diphenyl ether, di(n-octyl)ether, or tetrahydrofuran; or a halogen-containing hydrocarbon).

To any temperature, the liquid phase containing the dispersant may be heated, as long as the dispersant and the precursor of the quantum dots dissolve at the temperature. Although the heating temperature depends also on pressure conditions and others, it is usually set at 150° C. or more. It is preferred that the heating temperature be relatively high. The reason for this is as follows. When the heating temperature is set at high, the precursor of the quantum dots poured into the dispersant decomposes quickly, and thus a large number of cores are formed all at once. It is therefore easy to produce quantum dots relatively small in particle diameter, which makes it easy to control the particle diameter of the quantum dots.

The precursor of the quantum dots can be poured into the heated dispersant in any manner.

Any reaction temperature at which the quantum dots are produced after pouring the precursor of the quantum dots into the heated dispersant can be used, as long as the dispersant and the precursor of the quantum dots melt or dissolve in an organic solvent, and also crystal growth takes place. Although the reaction temperature varies depending also on pressure conditions and others, it is usually set at 150° C. or more.

Examples of methods for producing core-shell-type quantum dots include the following. Fine particles of a semiconductor compound that will serve as cores are first made by the hot soap process described above, and then shells are formed on the surfaces of the cores made of the fine particles of the semiconductor compound by the hot soap process.

Specifically, core-shell-type quantum dots that the core part of each dot is covered with a shell can be produced by heating a dispersant, and pouring, into the heated dispersant, fine particles of a semiconductor compound that serve as cores, and a precursor of another semiconductor compound for shells. The above-described dispersants and solvents can be used in this hot soap process as well.

The fine particles of the semiconductor, serving as the cores, and the precursor of the shells may be poured into the dispersant at one time, or the former may be poured into the dispersant earlier than the latter. It is, however, preferable to pour gradually the precursor of the shells into the dispersant after pouring the fine core particles. The reason for this is as follows. If the precursor of the shells is poured into the dispersant earlier than the fine core particles, or if a large amount of the precursor is poured into the dispersant at one time, the precursor forms cores, and thus fine particles, each particle consisting only of the material for the shell part, may be produced.

After pouring the fine core particles and the precursor of the shells into the heated dispersant, reaction for covering the cores with the shells may be carried out at any temperature, as long as the dispersant and the precursor of the shells melt or dissolve in an organic solvent, and also the crystal growth of the material for the shells takes place. Although the reaction temperature varies depending also on pressure conditions and others, it is usually 100° C. or more.

The hot soap process is usually performed in an atmosphere of an inert gas such as argon or nitrogen gas.

Generally, the quantum dots produced by the hot soap process are separated from the dispersant. Examples of techniques useful herein for separation include precipitation using centrifugation, floatation, or frothing; filtration using caking or clarification; and pressing.

The quantum dots produced in the above-described manner are in the state that part of the dispersant used in the hot soap process is attached to their surfaces. If the dispersant has a glass transition temperature and a melting point of 90° C. or more, it acts as the heat-resistant protective material, so that the quantum dots to which the dispersant is attached can be used as they are.

However, if the glass transition temperature and/or the melting point of the dispersant is less than 90° C., it is necessary to replace the dispersant with a heat-resistant protective material whose glass transition temperature and melting point are 90° C. or more. In this way, there can be obtained the quantum dots protected by the heat-resistant protective material that can be used in the EL device of the present invention.

Any method can be employed to replace the dispersant with a heat-resistant protective material. For example, the quantum dots and a large amount of a heat-resistant protective material are heated while mixing them in a solvent in an atmosphere of an inert gas. In this manner, the dispersant attached to the surfaces of the quantum dots can be replaced with the heat-resistant protective material existing in a large amount. Although any amount of the heat-resistant protective material can be used to replace the dispersant, it is usually at least five times the weight of the quantum dots. The heating time is usually 1 to 48 hours.

Quantum dots protected by a conventional protective material such as TOPO are commercially available. It is therefore also possible to obtain quantum dots protected by a heat-resistant protective material by replacing the protective material in the commercial product with a heat-resistant protective material whose glass transition temperature and melting point are 90° C. or more. The above-described method of replacement can be employed to replace the conventional protective material.

Figure 2:
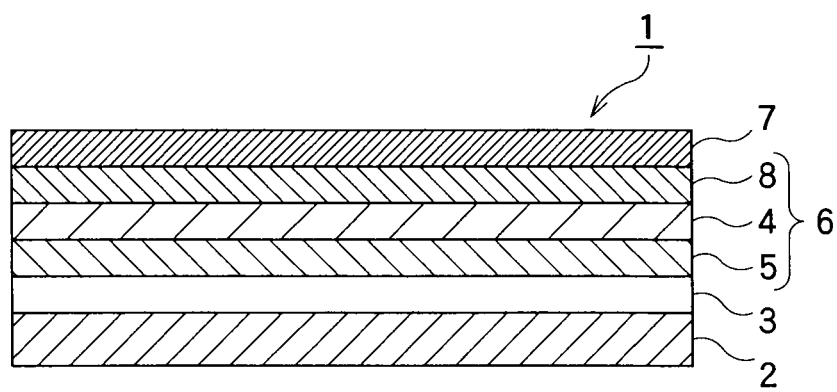
FIG. 2 is a schematic cross-sectional view showing another embodiment of the EL device of the present invention.

Description of the quantum dots for use in the EL device of the present invention, protected by the heat-resistant protective material, was given above. The EL device of the present invention will now be described with reference to FIGS. 1 and 2. FIGS. 1 and 2 are schematic cross-sectional views showing embodiments of the EL device of the present invention.

In FIGS. 1 and 2, an EL device 1 has a layered structure that a first electrode 3, an EL layer 6 containing a luminescent layer 4, and a second electrode 7 that is an opposite electrode to the first electrode 3 are layered on a substrate 2 in the order named.

As will be described later, the EL layer 6 may be either a single layer consisting only of the luminescent layer 4, or a laminate of two or more layers (see FIGS. 1 and 2), as long as it contains at least the luminescent layer 4. Moreover, the EL device of the present invention may comprise layers other than the electrodes and the EL layer.

The constituent layers of the EL device of the invention will be described hereinafter.

(Substrate)

The substrate 2 supports the first electrode 3 and the other layers formed after it. Namely, in FIGS. 1 and 2, the substrate 2 supports the first electrode 3, the EL layer 6, and the second layer 7. If the EL device is of the type that the emitted light is extracted from the substrate 2 side, it is preferred that the substrate 2 be transparent. However, if the EL device is of the type that the emitted light is extracted from the second electrode 7 side, the substrate 2 need not be transparent.

Examples of transparent substrates useful herein include glass substrates made of soda-lime glass, alkali glass, lead alkali glass, borosilicate glass, aluminosilicate glass, and silica glass; and resin substrates made from resins that can be formed into films.

Preferably, resins for resin substrates have relatively high resistance to solvents and heat. Specific examples of such resins include fluororesins, polyethylene, polypropylene, polyvinyl chloride, polyvinyl fluoride, polystyrene, ABS resins, polyamide, polyacetal, polyester, polycarbonate, modified polyphenylene ethers, polysulfone, polyallylate, polyether imide, polyether sulfone, polyamide imide, polyimide, polyphenylene sulfide, liquid crystalline polyester, polyethylene terephthalate, polybutylene terephthalate, polyethylene naphthalate, polymicroyxylene dimethylene terephthalate, polyoxymethylene, polyether sulfone, polyether ether ketone, polyacrylate, acrylonitrile-styrene resins, phenol resins, urea resins, melamine resins, unsaturated polyester resins, epoxy resins, polyurethane, silicone resins, and non-crystalline polyolefins. Copolymers of the above compounds may also be used. Furthermore, a substrate having the gas-barrier properties of shielding gases such as moisture and oxygen may also be used, if necessary.

Although it is favorable to select a suitable thickness for the substrate 2 depending on the material for the substrate 2 and the intended use of the EL device to be produced, the thickness of the substrate 2 is usually about 0.005 mm to 5 mm.

Electrodes

Of a pair of the electrodes (the first electrode 3 and the second electrode 7) formed on the substrate, the electrode (the first electrode 3) formed on the substrate 2 side may be either the anode or the cathode, but it is preferably the anode. This is because, in general, an EL device can be produced stably if an anode is formed on a substrate earlier than a cathode.

Of the first and second electrodes, the electrode situated on the side from which the emitted light is extracted must be transparent. On the other hand, the electrode on the other side, opposite to the side from which the emitted light is extracted, may be either transparent or non-transparent.

It is preferred that the first electrode and the second electrode be low in electrical resistance. Although metallic materials, which are electrically conductive, are usually used for the electrodes, organic or inorganic compounds may also be used.

A conductive material whose work function is great is favorably used for the anode so that the injection of holes can be done easily. Examples of such conductive materials include metals such as alkaline metals and alkaline earth metals, e.g., Au, Ta, W, Pt, Ni, Pd, Cr, Cu, and Mo; oxides of these metals; alloys such as Al alloys, e.g., AlLi, AlCa, and AlMg, Mg alloys, e.g., MgAg, Ni alloys, Cr alloys, alkaline metal alloys, and alkaline earth metal alloys; inorganic oxides such as indium tin oxide (ITO), indium zinc oxide (IZO), zinc oxide (ZnO), and indium oxide; electrically conductive polymers, such as polythiophene, polyaniline, polyacetylene, polyalkylthiophene derivatives, and polysilane derivatives that are doped with metals; and α-Si and α-SiC. These electrically conductive materials may be used either singly or in combination. When two or more conductive materials are used, a laminate of layers of the materials may be used for the anode.

A conductive material whose work function is small is favorably used for the cathode so that the injection of electrons can be done easily. Examples of such conductive materials include magnesium alloys such as MgAg, aluminum alloys such as AlLi, AlCa and AlMg, and alloys of such alkaline or alkaline earth metals as Li, Cs, Ba, Sr, and Ca.

Conventional techniques for making electrodes can be used to form films of the first and second electrodes. For example, such a technique as physical vapor deposition (PVD), e.g., vacuum vapor deposition, sputtering, EB deposition, or ion plating, or chemical vapor deposition (CVD) can be used. Further, any technique for patterning can be used for patterning the first and second electrodes, as long as an electrode in the desired pattern can be precisely obtained. Specifically, photolithography, etc. can be employed.

(EL Layer)

The EL layer contains at least a luminescent layer.

Although the EL layer 6 may be composed only of the luminescent layer 4 (quantum-dots-containing layer), it may also have a layered structure composed of the luminescent layer and other various layers such as a hole-injection layer, a hole-transport layer, an electron-injection layer, and an electron-transport layer so that it can exhibit improved electron- or hole-injection, or electron- or hole-transport characteristics. Each constituent layer of the EL layer may have two or more functions. Such a layer may be a hole-injection-transport layer having both the function of a hole-transport layer and that of a hole-injection layer, or an electron-injection-transport layer having both the function of an electron-transport layer and that of an electron-injection layer, for example. The function of an electron-transport layer or that of a hole-transport layer may also be given to the luminescent layer.

Other useful constituent layers of the EL layer include a carrier-block layer for preventing holes or electrons from going through the EL layer and also for preventing diffusion of excitons to trap them within the luminescent layer, thereby increasing recombination efficiency.

The EL layer can have any layered structure; the luminescent layer and the other layers may be suitably layered on top of each other. Examples of layered structures include the following: hole-transport layer 5/luminescent layer 4 (see FIG. 1(a)), hole-transport layer 5/luminescent layer 4/electron-injection layer 8 (see FIG. 2), hole-injection layer/hole-transport layer/luminescent layer, hole-injection layer/hole-transport layer/luminescent layer/electron-transport layer, and hole-injection layer/hole-transport layer/luminescent layer/hole-blocking layer/electron-transport layer, the firstly described layer in each layered structure being on the anode side, the layers in each structure being layered in the order named.

The luminescent layer, the hole-injection layer, the hole-transport layer, the electron-transport layer, and the electron-injection layer will be described hereinafter.

(1) Luminescent Layer

The luminescent layer 4 contains the quantum dots 4a protected by the specified protective material (heat-resistant protective material) 4b and has the function of providing a space in which electrons and holes recombine with each other to emit light (see FIG. 1(b)). Electrons and holes may recombine with each other at any site in the luminescent layer; the site may be on the quantum dots, or on the protective material by which the quantum dots are protected, or in any of the constituent materials (binder component, etc.) of the luminescent layer other than the quantum dots and the protective material.

The luminescent layer may be a layer that emits light of a single color of blue, green, yellow, orange, or red, for example; a layer that emits white light, a mixture of lights of two or more colors; or a layer having luminescent patterns of the three primary colors. White light can be obtained by superposing lights emitted from two or more luminescent substances. The luminescent layer may emit white light by the superposition of lights of two colors having specified emission peak wavelengths, emitted from two different luminescent substances, or by the superposition of lights of three colors having specified emission peak wavelengths, emitted from three different luminescent substances.

Description of the quantum dots and that of the protective material for protecting the quantum dots were given above, so that they will not be repeated here.

In the present invention, materials other than the quantum dots, e.g., such a luminescent material as is usually used in an organic EL device, may be used as the luminescent material together with the quantum dots to be incorporated in the luminescent layer. Specific examples of such luminescent materials include the following luminescent pigment materials, luminescent metallic complex materials, and luminescent polymer materials.

Examples of luminescent pigment materials include cyclopentadiene derivatives, tetraphenylbutadiene derivatives, triphenylamine derivatives, arylamine derivatives, oxadiazole derivatives, pyrazoloquinoline derivatives, distyrylbenzene derivatives, distyrylpyradine derivatives, distyrylarylene derivatives, silole derivatives, carbazole derivatives, thiophene cyclic compounds, pyridine cyclic compounds, perinone derivatives, perylene derivatives, oligothiophene derivatives, trifumanylamine derivatives, coumarin derivatives, oxadiazole dimers, pyrazoline dimers, and phenanthrolines.

Specific examples of triphenylamine derivatives useful herein include N,N'-bis-(3-methylphenyl)-N,N'-bis-(phenyl)-benzidine (TPD), 4,4,4-tris(3-methylphenylphenylamino)triphenylamine (MTDATA), 4,4',4"-tris[2-naphthyl(phenyl)amino]triphenylamine (2-TNATA), and 4,4',4"-tri(N-carbazoleyl)triphenylamine (TCTA).

Specific examples of arylamine derivatives useful herein include bis(N-(1-naphthyl-N-phenyl)benzidine) (α-NPD). Specific examples of oxadiazole derivatives include (2-(4-biphenylyl)-5-(4-tert-butylphenyl)-1,3,4-oxadiazole) (PBD) and 1,3-bis[2-(2,2'-bipyridine-6-yl)-1,3,4-oxadiazo-5-yl]benzene (Bpy-OXD).

Specific examples of dinaphthylanthracene derivatives useful herein include 3-tert-butyl-9,10-di(naphth-2-yl)anthracene (TBADN) and 9,10-di-2-naphthylanthracene (DNA).

Specific examples of distyrylarylene derivatives useful herein include 2,2',7,7'-tetrakis(2,2'-diphenylvinyl)spiro-9,9'-bifluorene (spiro-DPVBi) and 1,4-bis(2,2-diphenylvinyl)benzene (DPVBi).

Specific examples of carbazole derivatives useful herein include 4,4-N,N'-dicarbazole-biphenyl (CBP), 4,4'-bis(9-carbazoleyl)-2,2'-dimethyl-biphenyl (CDBP), 1,3-bis(carbazole-9-yl)benzene (MCP), 4,4'-bis(carbazole-9-yl)-9,9-dimethyl-fluorene (DMFL-CBP), 4,4'-bis(carbazole-9-yl)-9,9-ditoluyl-fluorene (DPFL-CBP), and 2,7-bis(9-carbazoleyl)-9,9-spirobifluorene (spiro-2CBP).

Specific examples of phenanthrolines useful herein include bathocuproin (BCP) and bathophenanthroline (BPhen). Specific examples of benzimidazole derivatives include 2,2',2"-(1,3,5-benzenetriyl)-tris(1-phenyl-1-H-benzimidazole) (TPBi).

These materials may be used either singly or in combination.

Examples of luminescent metallic complex materials useful herein include aluminum quinolinol complexes, benzoquinolinol beryllium complexes, benzoxazole zinc complexes, benzothiazole zinc complexes, azomethyl zinc complexes, porphyrin zinc complexes, europium complexes, iridium metallic complexes, platinum metallic complexes, and metallic complexes having, as a center metal, such a metal as Al, Zn, Be, Ir or Pt, or such a rare earth metal as Tb, Eu or Dy, and, as a ligand, oxadiazole, thiadiazole, phenylpyridine, phenybenzimidazole, quinoline structure, or the like.

Specific examples of the above metallic complex materials include tris(8-quinolinol)aluminum complexes ($Alq_3$), bis(2-methyl-8-quinolate)(p-phenylphenolate)aluminum complexes (BAlq), tri(dibenzoylmethyl)-phenanthroline europium complexes, and bis(benzoquinolate)beryllium (Bebq). These materials may be used either singly or in combination.

Examples of luminescent polymer materials useful herein include polyparaphenylenevinylene derivatives, polythiophene derivatives, polyparaphenylene derivatives, polysilane derivatives, polyacetylene derivatives, polyvinylcarbazole, polyfluorenone derivatives, polyfluorene derivatives, polyquinoxaline derivatives, polydialkylfluorene derivatives, and copolymers of these derivatives. It is also possible to use materials obtained by polymerizing the above-enumerated luminescent pigment or metallic complex materials.

The luminescent pigment, metallic complex, or polymer material (host material) acts as the binder component 4c in the quantum-dots-containing luminescent layer 4 and receives electrons and holes from a layer adjoining the luminescent layer to allow them to recombine with each other (FIG. 1(b)).

For fulfilling with higher certainty the main object of the present invention, i.e., suppression of coagulation of quantum dots under high-temperature condition, it is preferred that the binder component of the luminescent layer have a glass transition temperature and a melting point of 90° C. or more, particularly 110° C. or more, more preferably 130° C. or more. By using a binder component that hardly softens even under such high-temperature conditions, it is possible to suppress the movement of the quantum dots under high-temperature conditions, thereby preventing coagulation of the quantum dots in the luminescent layer.

The binder component (host material) whose glass transition temperature and melting point are 90° C. or more is at least one compound selected from, for example, 4,4',4"-tris [2-naphthyl(phenyl)amino]triphenylamine (2-TNATA), 4,4', 4"-tri[N-carbazoleyl]triphenylamine (TCTA), bis(N-(1-naphthyl-N-phenyl)benzidine) (α-NPD), 1,3-bis[2-(2,2'-bipyridin-6-yl)-1,3,4-oxadizao-5-yl]benzene (Bpy-OXD), 3-tert-butyl-9,10-di(naphth-2-yl)anthracene (TBADN), 2,2', 7,7'-tetrakis(2,2'-diphenylvinyl)spiro-9,9'-bifluorene (spiro-DVBi), 1,3-bis(carbazole-9-yl)benzene (MCP), 4,4'-bis(9-carbazoleyl)-2,2'-dimethyl-biphenyl (CDBP), 4,4'-bis (carbazole-9-yl)-9,9-dimethyl-fluorene (DMFL-CBP), 4,4'-bis(carbazole-9-yl)-9,9-ditoluyl-fluorene (DPFL-CBP), 2,2', 2"-(1,3,5-benzenetriyl)-tris(1-phenyl-1-H-benzimidazole) (TPBi), 2,7-bis(9-carbazoleyl)-9,9-spirobifluorene (spiro-2CBP), tris(8-quinolinol)aluminum complexes ($Alq_3$), bis(2-methyl-8-quinolate)(p-phenylphenolate)aluminum complexes (BAlq), and derivatives of these compounds.

Besides the above-described luminescent materials, the luminescent layer may contain, as the binder component, such binder resins as polycarbonate, polystyrene, polyallylate, and polyester; and thermosetting or photo-setting resins such as epoxy resins, phenol resins, melamine resins, polyester resins, polyurethane resins, and silicone resins. If such resins are incorporated in the luminescent layer, it is preferable to select resins whose glass transition temperatures and melting points are 90° C. or more, from the viewpoint of suppression of coagulation of the quantum dots.

From the same point of view, it is more preferred that all the materials making up the luminescent layer have glass transition temperatures and melting points of 90° C. or more, particularly 110° C. or more, more preferably 130° C. or more. This is because by composing the luminescent layer so that it never softens as a whole even under high-temperature conditions, e.g., at a temperature of 90° C. or more, it is possible to suppress coagulation of the quantum dots with much higher certainty.

For the purposes of increasing luminous efficiency and changing emission wavelength, a fluorescent or phosphorescent dopant may be incorporated in the luminescent layer together with the above-described luminescent material. Examples of such dopants include perylene derivatives, coumarin derivatives, rubrene derivatives, quinacridone derivatives, squalium derivatives, porphyrin derivatives, styryl colorants, tetracene derivatives, pyrazoline derivatives, decacyclene, phenoxazone, quinoxaline derivatives, carbazole derivatives, and fluorene derivatives. Specific examples of these dopants include 2,5,8,11-tetra-tert-butylperylene (TBPe), coumarin 6, Nile Red, 1,4-bis(2,2-diphenylvinyl) benzene (DPVBi), and 1,1,4,4-tetraphenyl-1,3-butadiene (TPB).

A phosphorescent organometallic complex having at its center an ion of such a heavy metal as white gold or iridium can be used as the phosphorescent dopant. Specific examples of such organometallic complexes include $Ir(ppy)_3$, $(ppy)_2Ir$ (acac), $Ir(BQ)_3$, $(BQ)_2Ir(acac)$, $Ir(THP)_3$, $(THP)_2Ir(acac)$, $Ir(BO)_3$, $(BO)_2(acac)$, $Ir(BT)_3$, $(BT)_2Ir(acac)$, $Ir(BTP)_3$, $(BTP)_2Ir(acac)$, $FIr_6$, and PtOEP.

The luminescent layer may have any thickness, as long as it can perform its function of providing a space where electrons and holes recombine with each other to emit light. The thickness of the luminescent layer may be about 1 to 200 nm, for example.

For forming the luminescent layer, any technique can be used as long as it can provide a luminescent layer in a fine pattern required for EL devices. Examples of such techniques include vapor deposition, printing, ink-jet printing, spin coating, casting, dipping, bar coating, blade coating, roll coating, gravure coating, flexographic printing, spray coating, and self-organization (alternate adsorption, self-organization monomolecular film process). Of these techniques, vapor deposition, spin coating, and ink-jet printing are preferably used herein.

Examples of vapor deposition include vacuum vapor deposition, sputtering, and ion plating. Specific examples of vacuum vapor deposition include resistance heating deposition, flash deposition, arc deposition, laser deposition, high-frequency heating deposition, and electron beam deposition.

When the luminescent layer is formed by applying a coating liquid by spin coating, ink-jet printing, or the like, any solvent can be used to prepare the coating liquid, as long as the materials for the luminescent layer can be dissolved or dispersed in it. Examples of such solvents include toluene, xylene, cyclohexanone, cyclohexanol, tetralin, mesitylene, methylene chloride, tetrahydrofuran, dichloroethane, and chloroform.

When fabricating a full- or multi-color display by the use of an EL device, it is necessary to form minute luminescent layers that emit lights different in color and to put them in a predetermined arrangement, and thus patterning luminescent layers is often needed. To obtain patterned luminescent layers different in luminescent color, a technique such as coating or deposition using a mask, or printing or ink-jet printing may be used to form each patterned luminescent layer that emits light of one color.

Walls may be present between the luminescent layers arranged. The presence of walls is advantageous in that fluorescent substances do not spread to the areas adjacent to the luminescent layers when the luminescent layers are formed by such a technique as ink-jet printing. To make the walls, a photo-curable or thermosetting resin such as a photosensitive polyimide resin or an acrylic resin, an inorganic material, or the like may be used. The material for the walls may be subjected to treatment for changing its surface energy (wettability).

(2) Hole-Injection Layer

A hole-injection layer may be formed between the anode and the luminescent layer, or between the anode and the hole-transport layer. Any hole-injecting material can be used for the hole-injection layer, as long as it can stabilize the injection of electrons into the luminescent layer. Examples of hole-injecting materials include arylamine derivatives, porphyrin derivatives, phthalocyanine derivatives, carbazole derivatives, and electrically conductive polymers such as polyaniline derivatives, polythiophene derivatives, and polyphenylene vinylene derivatives.

Specific examples of arylamine derivatives useful herein include bis(N-(1-naphthyl-N-phenyl)benzidine (α-NPD). Specific examples of triphenylamine derivatives include N,N'-bis-(3-methylphenyl)-N,N'-bis-(phenyl)-benzidine (TPD), copoly[3,3'-hydroxy-tetraphenyl-benzidine/diethyleneglycol]carbonate(PC-TPD-DEG), and 4,4,4-tris(3-methylphenylphenylamino)triphenylamine (MTDATA). Specific examples of carbazole derivatives useful herein include polyvinyl carbazole (PVK), and those of polythiophene derivatives include poly(3,4-ethylenedioxythiophene)-polystyrenesulfonic acid (PEDOT-PSS).

The above-enumerated porphyrin derivatives, arylamine derivatives, etc. may be mixed with Lewis acids, tetracyanoquinodimethane tetrafluoride (F4-TCNQ), iron chloride, inorganic oxides such as vanadium oxide and molybdenum oxide, or the like.

For the hole-injection layer, such inorganic materials as metallic oxides and carbides may also be used. Examples of inorganic materials useful herein include metallic oxides such as vanadium oxide, molybdenum oxide, ruthenium oxide, aluminum oxide, and titanium oxide; and carbides such as amorphous carbon, C60, and carbon nanotubes.

Furthermore, materials having groups capable of binding with the electrodes can be used for the hole-injection layer as well. Examples of such materials include phosphoric acid compounds, carboxylic acid compounds, sulfonic acid compounds, and silane coupling agents. Specific examples of these materials include 4-(trifluoromethyl)-benzenesulfonyl chloride, 4-chlorophenylphosphorodichloridate, and 9-fluorenylmethylchloroformate.

The hole-injection layer can have any thickness, as long as it can fully perform its function. Although such a technique as vapor deposition, printing, ink-jet printing, spin coating, casting, dipping, bar coating, blade coating, roll coating, gravure coating, flexographic printing, spray coating, or self-organization (alternate adsorption, self-organization monomolecular film process) can be used to form the hole-injection layer, other techniques can be used as well. It is particularly preferable to use vapor deposition, spin coating, or ink-jet printing.

(3) Hole-Transport Layer

A hole-transport layer may be formed between the anode and the luminescent layer, or between the hole-injection layer and the luminescent layer. Any hole-transporting material can be used for the hole-transport layer, as long as it can stabilize the transport of electrons into the luminescent layer.

Particularly, hole-transporting materials having high hole-transportability are preferred. It is also preferred that hole-transporting materials do not allow electrons moving from the cathode to go through them (electron-blocking materials). This is because by blocking electrons, it is possible to increase the efficiency of recombination of holes and electrons in the luminescent layer.

Examples of such hole-transporting materials include arylamine derivatives, anthracene derivatives, carbazole derivatives, thiophene derivatives, fluorene derivatives, distyrylbenzene derivatives, and spiro compounds.

Specific examples of arylamine derivatives useful herein include bis(N-(1-naphthyl-N-phenyl)benzidine (α-NPD). Specific examples of triphenylamine derivatives include copoly[3,3'-hydroxy-tetraphenylbenzidine/diethyleneglycol]carbonate(PC-TPD-DEG), N,N'-bis-(3-methylphenyl)-N,N'-bis-(phenyl)-benzidine (TPD), and 4,4,4-tris(3-methylphenylphenylamino)triphenylamine (MTDATA).

Specific examples of anthracene derivatives include poly [(9,9-dioctylfluorenyl-2,7-diyl)-co-(9,10-anthracene)] and 9,10-di-2-naphthylanthracene (DNA).

Specific examples of carbazole derivatives useful herein include polyvinyl carbazole (PVK) and 4,4-N,N'-dicarbazole-biphenyl (CBP).

Specific examples of distyrylarylene derivatives useful herein include 1,4-bis(2,2-diphenylvinyl)benzene (DPVBi).

Specific examples of thiophene derivatives include poly [(9,9-dioctylfluorenyl-2,7-diyl)-co-(bithiophene)].

Specific examples of fluorene derivatives include poly[(9, 9-dioctylfluorenyl-2,7-diyl)-co-(4,4'-(N-(4-sec-butylphenyl))diphenylamine)] (TFB).

Specific examples of spiro compounds include poly[(9,9-dioctylfluorenyl-2,7-diyl)-alt-co-(9,9'-spiro-bifluorene-2,7-diyl)].

The above materials may be used either singly or in combination.

(4) Electron-Transport Layer

An electron-transport layer may be formed between the luminescent layer and the cathode, or between the luminescent layer and the electron-injection layer. Any electron-transporting material can be used for the electron-transport layer, as long as it can transport electrons injected from the cathode into the luminescent layer. Particularly, electron-transporting materials having high electron-transportability are preferred. It is also preferred that electron-transporting materials do not allow holes moving from the anode to go through them (hole-blocking materials). This is because by blocking holes, it is possible to increase the efficiency of recombination of holes and electrons in the luminescent layer.

Examples of electron-transporting materials useful herein include oxadiazoles, triazoles, phenanthrolines, silole derivatives, cyclopentadiene derivatives, and aluminum complexes. Specific examples of oxadiazole derivatives include (2-(4-biphenylyl)-5-(4-tert-butylphenyl)-1,3,4-oxadiazole (PBD). Specific examples of phenanthrolines include bathocuproin (BCP) and bathophenanthroline (BPhen). Specific examples of aluminum complexes include tris(8-quinolinol)aluminum complexes ($Alq_3$) and bis(2-methyl-8-quinolate)(p-phenylphenolate)aluminum complexes (BAlq).

The electron-transport layer may be formed in any thickness, as long as it fully performs the function of transporting electrons. A vapor deposition process can be used to form the electron-transport layer.

(5) Electron-Injection Layer

An electron-injection layer may be formed between the luminescent layer and the cathode, or between the electron-transport layer and the cathode. Any electron-injecting material can be used for the electron-injection layer, as long as it can stabilize the injection of electrons into the luminescent layer.

Examples of electron-injecting materials useful herein include alkali or alkaline earth metals, oxides thereof, fluoride thereof, and organometallic complexes of alkali metals, e.g., aluminum, strontium, calcium, lithium, cesium, magnesium oxide, aluminum oxide, strontium oxide, lithium oxide, lithium fluoride, magnesium fluoride, strontium fluoride, calcium fluoride, barium fluoride, cesium fluoride, and sodium polymethacrylate polystyrenesulfonate. Of these, fluorides of alkaline earth metals are preferred because they can improve organic EL layers in stability and life.

The electron-injection layer may be formed in any thickness, as long as it fully performs the function of injecting electrons. A vapor deposition process can be used to form the electron-injection layer.

The luminescent layer, the hole-injection layer, the hole-transport layer, the electron-injection layer, and the electron-transport layer, constituent layers of the EL layer, have been described. The EL layer may have functions other than those of these layers.

EXAMPLES

Synthesis of Heat-Resistant Protective Materials

Synthesis Example 1

A compound (formula (1)) was synthesized by adding, as the hydrophilic group, a group having phosphine oxide to the carbazole group in 4,4'-bis(9-carbazoleyl)-2,2'-dimethyl-biphenyl (CDBP: Tg 111° C., melting point above 111° C.). (The compound is referred to as CAP-A.)

It can be considered that the glass transition temperature and the melting point of CAP-A are equal to those of CDBP.

[Chemical Formula 1]

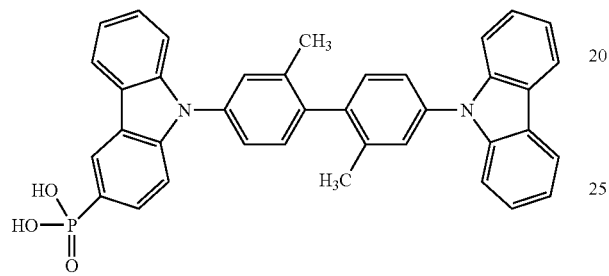

Formula (1)

Synthesis Example 2

A compound (formula (2)) was synthesized by adding, as the hydrophilic group, a group having phosphine oxide to the carbazole group in 4,4'-bis(9-carbazoleyl)-9,9'-dimethyl-fluorene (DMFL-CBP: Tg 131° C., melting point above 131° C.). (The compound is referred to as CAP-B.)

It can be considered that the glass transition temperature and the melting point of CAP-B are equal to those of DMFL-CBP.

[Chemical Formula 2]

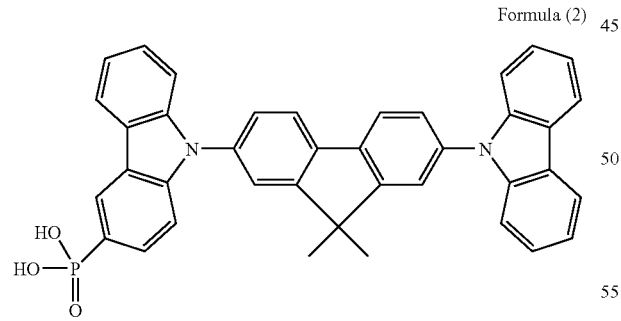

Formula (2)

Synthesis of Heat-Resistant Protective Material

Synthesis Example 3

A compound (formula (3)) was synthesized by adding, as the hydrophilic group, a group having phosphine oxide to the phenyl group in bis(N-(1-naphthyl-N-phenyl)benzidine) (α-NPD: Tg 95° C., melting point above 95° C.). (The compound is referred to as CAP-C.)

It can be considered that the glass transition temperature and the melting point of CAP-C are equal to those of α-NPD.

[Chemical Formula 3]

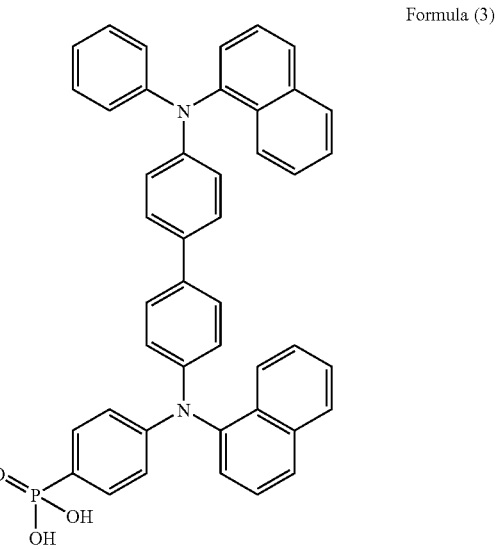

Formula (3)

Synthesis of Protective Material

Synthesis Example 4

A compound (formula (4)) was synthesized by adding, as the hydrophilic group, a group having phosphine oxide to the cyclohexyl group in 1,1-bis-(4-bis(4-methylphenyl)-aminophenyl)-cyclohexane (Tg=78° C.). (The compound is referred to as CAP-D.)

It can be considered that the glass transition temperature and the melting point of CAP-D are equal to those of 1,1-bis-(4-bis(4-methylphenyl)-aminophenyl)-cyclohexane.

[Chemical Formula 4]

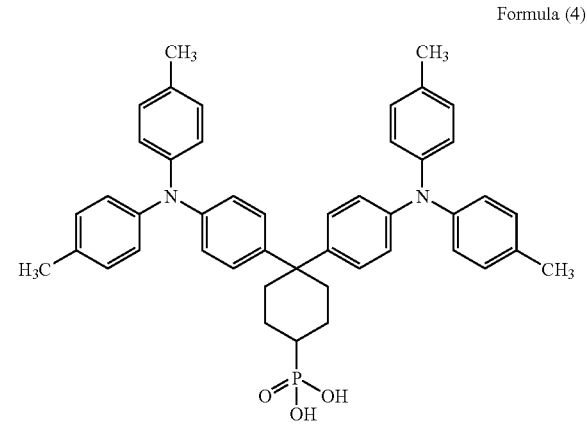

Formula (4)

Synthesis of Protective Material

Synthesis Example 5

A compound (formula (5)) was synthesized by adding, as the hydrophilic group, a group having phosphine oxide to the phenyl group in N,N'-bis-(3-methylphenyl)-N,N'-bis-(phenyl)-benzidine (TPD: Tg=60° C.). (The compound is referred to as CAP-E.)

It can be considered that the glass transition temperature and the melting point of CAP-E are equal to those of TPD.

[Chemical Formula 5]

Formula (5)

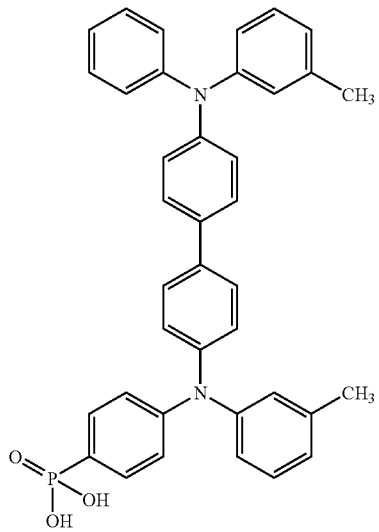

[Attachment of Heat-Resistant Protective Material to Quantum Dot Surfaces]

(Attachment of CAP-A)

Toluene was added to CAP-A synthesized in Synthesis Example 1. The mixture was stirred to dissolve CAP-A in the toluene, thereby preparing a toluene solution of CAP-A.

Subsequently, the toluene solution of CAP-A was added dropwise, in an atmosphere of argon gas at room temperature (26° C.), to a stirred toluene in which core-shell-type quantum dots with TOPO (melting point 50-54° C.) attached to their surfaces (manufactured by evident TECHNOLOGIES, USA, core: CdSe, shell: ZnS, emission wavelength: 520 nm) [referred to as QD-TOPO] were dispersed. After stirring this reaction solution for 12 hours, the atmosphere was changed from argon gas to air, and toluene was added to the solution in an amount equal to that of the toluene lost by evaporation. To this solution, ethanol was added dropwise.

The precipitates were centrifugally separated from the reaction solution; they were mixed with and dispersed in toluene. To this dispersion, ethanol was added dropwise for reprecipitation to purify the precipitates.

The liquid containing the reprecipitates was subjected to centrifugal separation. In this manner, a purified product of the core-shell-type quantum dots with CAP-A attached thereto [referred to as QD-A] was obtained.

(Attachment of Cap-B, Cap-C, Cap-D, and Cap-E)

The above procedure for attaching CAP-A was repeated, except that a toluene solution of CAP-B, that of CAP-C, that of CAP-D, or that of CAP-E was used instead of the toluene solution of CAP-A, thereby obtaining a purified product of the core-shell-type quantum dots with CAP-B attached thereto [referred to as QD-B], a purified product of the core-shell-type quantum dots with CAP-C attached thereto [referred to as QD-C], a purified product of the core-shell-type quantum dots with CAP-D attached thereto [referred to as QD-D], and a purified product of the core-shell-type quantum dots with CAP-E attached thereto [referred to as QD-E].

Example 1

A thin film (thickness: 150 nm) of indium-tin oxide (ITO) was deposited on a glass substrate by sputtering to form an anode. The substrate having the anode was cleaned and was then subjected to UV ozone treatment.

Then the ITO thin film was spin-coated with a solution of polyethylene dioxythiophene-polystyrenesulfonic acid (PEDOT-PSS) in the atmosphere, and the coating film was dried to form a hole-injection layer (thickness: 20 nm).

In a glove box at a low oxygen content (oxygen content: below 0.1 ppm) and a low humidity (moisture vapor content: below 0.1 ppm), the hole-injection layer was spin-coated with a mixture prepared by mixing 4,4'-bis(carbazole-9-yl)-9,9-dimethyl-fluorene (DMFL-CBP) and QD-A with toluene, thereby forming a luminescent layer (thickness: 40 nm). DMFL-CBP and QD-A in the above mixture were in the weight ratio of 9:5.

A film of bis(2-methyl-8-quinolate)(p-phenylphenolate) aluminum complex (BAlq) was deposited on the surface of the luminescent layer on the substrate in a vacuum (pressure: $5 \times 10^{-5}$ Pa) by resistance heating deposition to form a hole-blocking layer (thickness: 60 nm).

Subsequently, a film of tris(8-quinolinol)aluminum complex ($Alq_3$) (thickness: 20 nm), that of LiF (thickness: 0.5 nm), and that of Al (thickness: 150 nm) were deposited on the hole-blocking layer in the order named by resistance heating deposition to form an electron-transport layer, an electron-injection layer, and a cathode, respectively.

The above layered product was sealed with non-alkali glass in a glove box at a low oxygen content (oxygen content: below 0.1 ppm) and a low humidity (moisture vapor content: below 0.1 ppm), whereby an EL device was produced.

A voltage was applied to between the anode and the cathode in the EL device, and the luminance of the light that the EL device was emitting vertically to the plane of the substrate was measured; luminescence originating from the quantum dots was confirmed. Further, the EL device was observed with the naked eyes; no emission defects such as dark spots were found.

Table 1 shows the glass transition temperatures and melting points of the protective materials used in Examples and Comparative Examples for protecting the quantum dots in the luminescent layer; whether heat treatment was carried out or not in Examples and Comparative Examples after forming the luminescent layer; and the conditions used for the heat treatment.

TABLE 1

| | Protective material for QD | Heat treatment |
|---|---|---|
| Example 1 | CAP-A: Tg 111° C., Melting point above 111° C. | Not carried out |
| Example 2 | CAP-B: Tg 131° C., Melting point above 131° C. | Not carried out |
| Example 3 | CAP-B: Tg 131° C., Melting point above 131° C. | Carried out at 120° C. for 30 minutes |
| Example 4 | CAP-B: Tg 131° C., Melting point above 131° C. | Carried out at 90° C. for 30 minutes |
| Example 5 | CAP-A: Tg 111° C., Melting point above 111° C. | Carried out at 120° C. for 30 minutes |
| Example 6 | CAP-A: Tg 111° C., Melting point above 111° C. | Carried out at 90° C. for 30 minutes |
| Example 7 | CAP-C: Tg 95° C., Melting point above 95° C. | Not carried out |

TABLE 1-continued

| | Protective material for QD | Heat treatment |
|---|---|---|
| Example 8 | CAP-C: Tg 95° C., Melting point above 95° C. | Carried out at 120° C. for 30 minutes |
| Example 9 | CAP-C: Tg 95° C., Melting point above 95° C. | Carried out at 90° C. for 30 minutes |
| Comparative Example 1 | TOPO melting point 50~54° C. | Not carried out |
| Comparative Example 2 | TOPO melting point 50~54° C. | Carried out at 120° C. for 30 minutes |
| Comparative Example 3 | CAP-D: Tg 78° C. | Not carried out |
| Comparative Example 4 | CAP-D: Tg 78° C. | Carried out at 120° C. for 30 minutes |
| Comparative Example 5 | CAP-D: Tg 78° C. | Carried out at 90° C. for 30 minutes |
| Comparative Example 6 | CAP-E: Tg 60° C. | Not carried out |
| Comparative Example 7 | CAP-E: Tg 60° C. | Carried out at 120° C. for 30 minutes |
| Comparative Example 8 | CAP-E: Tg 60° C. | Carried out at 90° C. for 30 minutes |

Example 2

An EL device was produced in the same manner as in Example 1, except that QD-B was used as the quantum dots instead of QD-A.

A voltage was applied to between the anode and the cathode in the EL device, and the luminance of the light that the EL device was emitting vertically to the plane of the substrate was measured; luminescence originating from the quantum dots was confirmed. Further, the EL device was observed with the naked eyes; no emission defects such as dark spots were found.

Example 3

An EL device was produced in the same manner as in Example 2, except that, after forming the luminescent layer on the substrate, the substrate was heated on a hot plate at 120° C. for 30 minutes in a glove box to remove the solvent remaining in the luminescent layer.

A voltage was applied to between the anode and the cathode in the EL device, and the luminance of the light that the EL device was emitting vertically to the plane of the substrate was measured; luminescence originating from the quantum dots was confirmed. Further, the EL device was observed with the naked eyes; no emission defects such as dark spots were found.

Example 4

An EL device was produced in the same manner as in Example 2, except that, after forming the luminescent layer on the substrate, the substrate was heated on a hot plate at 90° C. for 30 minutes in a glove box to remove the solvent remaining in the luminescent layer.

A voltage was applied to between the anode and the cathode in the EL device, and the luminance of the light that the EL device was emitting vertically to the plane of the substrate was measured; luminescence originating from the quantum dots was confirmed. Further, the EL device was observed with the naked eyes; no emission defects such as dark spots were found.

Examples 5 and 6

EL devices were produced in the same manner as in Example 1, except that, after forming the luminescent layer on the substrate, the substrate was heated on a hot plate at 120° C. for 30 minutes (Example 5) or at 90° C. for 30 minutes (Example 6) in a glove box to remove the solvent remaining in the luminescent layer.

A voltage was applied to between the anode and the cathode in each EL device, and the luminance of the light that the EL device was emitting vertically to the plane of the substrate was measured; luminescence originating from the quantum dots was confirmed. Further, the EL devices were observed with the naked eyes; no emission defects such as dark spots were found.

Examples 7-9

An EL device was produced in the same manner as in Example 2, 3 or 4, except that QD-C was used as the quantum dots instead of QD-A (Example 7: no heat treatment was carried out; Example 8: heat treatment was carried out at 120° C. for 30 minutes; Example 9: heat treatment was carried out at 90° C. for 30 minutes).

A voltage was applied to between the anode and the cathode in each EL device, and the luminance of the light that the EL device was emitting vertically to the plane of the substrate was measured; luminescence originating from the quantum dots was confirmed. Further, the EL devices were observed with the naked eyes; no emission defects such as dark spots were found.

Comparative Example 1

An EL device was produced in the same manner as in Example 1, except that QD-TOPO was used as the quantum dots instead of QD-A.

A voltage was applied to between the anode and the cathode in the EL device, and the luminance of the light that the EL device was emitting vertically to the plane of the substrate was measured; luminescence originating from the quantum dots was confirmed. Further, the EL device was observed with the naked eyes; no emission defects such as dark spots were found.

Comparative Example 2

An EL device was produced in the same manner as in Comparative Example 1, except that, after forming the luminescent layer on the substrate, the substrate was heated on a hot plate at 120° C. for 30 minutes in a glove box to remove the solvent remaining in the luminescent layer.

A voltage was applied to between the anode and the cathode in the EL device, and the luminance of the light that the EL device was emitting vertically to the plane of the substrate was measured. Although luminescence originating from the quantum dots was confirmed, its state was non-uniform.

Comparative Examples 3-5

An EL device was produced in the same manner as in Example 2, 3 or 4, except that QD-D was used as the quantum dots instead of QD-A (Comparative Example 3: no heat treatment was carried out; Comparative Example 4: heat treatment was carried out at 120° C. for 30 minutes; Comparative Example 5: heat treatment was carried out at 90° C. for 30 minutes).

A voltage was applied to between the anode and the cathode in each EL device, and the luminance of the light that the EL device was emitting vertically to the plane of the substrate was measured. As for the EL device of Comparative Example 3, luminescence originating from the quantum dots was confirmed, and no emission defects such as dark spots were found during observation with the naked eyes. On the other hand, as for the EL devices produced in Comparative Examples 4 and 5 in which heat treatment was carried out, after forming the luminescent layer, at 120° C. for 30 minutes (Comparative Example 4) and at 90° C. for 30 minutes (Comparative Example 5), although luminescence originating from the quantum dots was observed, its state was non-uniform.

Comparative Examples 6-8

An EL device was produced in the same manner as in Example 2, 3 or 4, except that QD-E was used as the quantum dots instead of QD-A (Comparative Example 6: no heat treatment was carried out; Comparative Example 7: heat treatment was carried out at 120° C. for 30 minutes; Comparative Example 8: heat treatment was carried out at 90° C. for 30 minutes).

A voltage was applied to between the anode and the cathode in each EL device, and the luminance of the light that the EL device was emitting vertically to the plane of the substrate was measured. As for the EL device of Comparative Example 6, luminescence originating from the quantum dots was confirmed, and no emission defects such as dark spots were found during observation with the naked eyes. On the other hand, as for the EL devices produced in Comparative Examples 7 and 8 in which heat treatment was carrier out, after forming the luminescent layer, at 120° C. for 30 minutes (Comparative Example 7) and at 90° C. for 30 minutes (Comparative Example 8), although luminescence originating from the quantum dots was observed, its state was non-uniform.

[Evaluation of Initial Performance]

Letting a constant current flow through each of the EL devices of Examples 1 to 9 and of Comparative Examples 1 to 8, the current efficiency at a luminance of 100 cd/m²·hour was measured.

Comparison of the EL devices of Examples 1, 5 and 6, that of the EL devices of Examples 2, 3 and 4, and that of the EL devices of Examples 7, 8 and 9 were made in respect of initial performance, the protective materials used for the EL devices in each group being the same. The EL devices in each group were found to have almost the same current efficiency regardless of the presence or absence of heating process in their production processes.

On the other hand, the results obtained from comparison between the EL device of Comparative Example 1 and that of Comparative Example 2, the protective materials used for the EL devices being the same, were as follows. The EL device produced in Comparative Example 2 in which heat treatment was carried out after forming the luminescent layer was non-uniform in luminescence, and its current efficiency was lower than that of the EL device of Comparative Example 1. The similar results were obtained from comparison of the EL devices of Comparative Examples 3 to 5 and from comparison of the EL devices of Comparative Examples 6 to 8. Namely, comparison between the EL device of Comparative Example 3 and those of Comparative Examples 4 and 5, and comparison between the EL device of Comparative Example 6 and those of Comparative Examples 7 and 8 were made, and the following were found. The EL devices produced in Comparative Examples 4 and 5 and Comparative Examples 7 and 8 in which heat treatment had been carried were non-uniform in luminescence and also low in current efficiency. The reason for this is considered that coagulation of the quantum dots in the luminescent layer took place in the heating processes in Comparative Examples 2, 4, 5, 7, and 8.

[Evaluation of Durability]

Each of the EL devices of Examples 1 to 9 and Comparative Examples 1 to 8 was driven by a constant current at a current density that makes the luminance 100 cd/m², and the time (life) taken before the luminance became 50 cd/m² was measured. The devices of Examples 1 to 9 and those of Comparative Examples 3 to 8 were longer than that of Comparative Example 1 in life.

From comparison of the EL devices using the same protective material, it was found that the heat treatment in their production processes contributed to prolongation of device life. Specifically, comparison between the EL device of Example 1 and those of Examples 5 and 6, comparison between the EL device of Example 2 and those of Examples 3 and 4, comparison between the EL device of Example 7 and those of Examples 8 and 9, comparison between the EL device of Comparative Example 3 and those of Comparative Examples of 4 and 5, and comparison between Comparative Example 6 and those of Comparative Examples 7 and 8 were made in respect to life, and the following were found: the devices produced by the production processes containing heat treatment had longer life than the devices produced by the production processes containing no heat treatment. This is because a greater part of the solvent remaining in the film (luminescent layer) was removed during the heat treatment. Particularly, when CAP-B having a glass transition temperature Tg of above 120° C. was used, the heat treatment at 120° C. was highly effective for the removal of the remaining solvent. The device of Example 3 produced by the production process containing the heat treatment at 120° C. was more excellent in life characteristics than that of Examples 4 produced by the production process containing the heat treatment at 90° C.

Moreover, the EL devices produced by the production processes in which the conditions for the heat treatment carried out after forming the luminescent layer were the same were in the following relationship in life: the devices using CAP-B (Examples 2 to 4)>the devices using CAP-A (Examples 1, 5 and 6)>the devices using CAP-C (Examples 7 to 9)>the devices using CAP-D (Comparative Examples 3 to 5)>the devices using CAP-E (Comparative Examples 6 to 8). Namely, when the glass transition temperature and melting point of the protective material for protecting the quantum dots in the luminescent layer were higher, the device life was longer. Particularly, the difference in life between the devices using CAP-C (Examples 7 to 9) whose glass transition temperature and melting point are above 90° C. and the devices using CAP-D (Comparative Examples 3 to 5) whose glass transition temperature and melting point are less than 90° C. was great. It was thus found that it is possible to obtain an EL device greatly improved in life characteristics by using, as the protective material for the protecting quantum dots, a material whose glass transition temperature and melting point are 90° C. or more.

The invention claimed is:

1. An electroluminescent device comprising:
a pair of electrodes; and
an electroluminescent layer comprising a luminescent layer and formed between the pair of electrodes,
wherein the luminescent layer comprises one or more protective materials and quantum dots whose surfaces are protected by the one or more protective materials, at least one of the protective materials has a glass transition temperature and a melting point of 130° C. or more, and the at least one protective material comprises in one molecule one or more hydrophilic residues and a hydrophobic group which is a residue of at least one compound selected from the group consisting of 4,4',4''-tri[N-carbazoleyl]triphenylamine, 3 tert-butyl-9,10-di(naphth-2-yl)anthracene, 2,2',7,7'-tetrakis(2,2'-diphenylvinyl)spiro-9,9'-bifluorene, 4,4'-bis(carbazole-9-yl)-9,9-dimethyl-fluorene, 4,4'-bis(carbazole-9-yl)-9,9-ditoluoyl-fluorene, 2,7-bis(9-carbazoleyl)-9,9-spirobifluorene, and tris(8-quinolinol)aluminum complexes.

2. The electroluminescent device according to claim 1, wherein the luminescent layer further comprises at least one binder component whose glass transition temperature and melting point are 90° C. or more.

3. The electroluminescent device according to claim 1, wherein all components of the luminescent layer have glass transition temperatures and melting points of 90° C. or more.

4. The electroluminescent device according to claim 2, wherein the at least one binder component is at least one compound selected from the group consisting of 4,4',4''-tris[2-naphthyl(phenyl)amino]triphenylamine, 4,4',4''-tri[N-carbazoleyl]triphenylamine, bis(N-(1-naphthyl-N-phenyl)benzidine), 1,3-bis[2-(2,2'-bipyridin-6-yl)-1,3,4-oxadizao-5-yl]benzene, 3-tert-butyl-9,10-di(naphth-2-yl)anthracene, 2,2',7,7'-tetrakis(2,2'-diphenylvinyl)spiro-9,9'-bifluorene, 1,3-bis(carbazole-9-yl)benzene, 4,4'-bis(9-carbazoleyl)-2,2'-dimethyl-biphenyl, 4,4'-bis(carbazole-9-yl)-9,9-dimethyl-fluorene, 4,4'-bis(carbazole-9-yl)-9,9-ditoluoyl-fluorene, 2,2',2''-(1,3,5-benzenetriyl)-tris(1-phenyl-1-H-benzimidazole), 2,7-bis(9-carbazoleyl)-9,9-spirobifluorene, tris(8-quinolinol)aluminum complexes, and bis(2-methyl-8-quinolate)(8-phenylphenolate)aluminum complexes.

5. The electroluminescent device according to claim 2, wherein the at least one binder component has the glass transition temperature and the melting point of 110° C. or more.

6. The electroluminescent device according to claim 2, wherein the at least one binder component has the glass transition temperature and the melting point of 130° C. or more.

7. The electroluminescent device according to claim 1, wherein the quantum dots have particle diameters in a range of 0.5 to 20 nm.

8. The electroluminescent device according to claim 1, wherein the quantum dots have particle diameters in a range of 1 to 10 nm.

9. The electroluminescent device according to claim 1, wherein the quantum dots have a rod shape.

10. The electroluminescent device according to claim 1, wherein the quantum dots have a disc shape.

11. The electroluminescent device according to claim 1, further comprising a substrate, wherein a first electrode of the pair of electrodes is provided on the substrate, and the electroluminescent layer is formed on the first electrode.

12. The electroluminescent device according to claim 11, wherein the first electrode is an anode.

13. The electroluminescent device according to claim 11, wherein the substrate is transparent.

14. The electroluminescent device according to claim 1, further comprising an electron-injection layer formed between the luminescent layer and a cathode of the pair of the electrodes.

15. The electroluminescent device according to claim 14, wherein the electron-injection layer comprises at least one compound selected from the group consisting of aluminum, strontium, calcium, lithium, cesium, magnesium oxide, aluminum oxide, strontium oxide, lithium oxide, lithium fluoride, magnesium fluoride, strontium fluoride, calcium fluoride, barium fluoride, cesium fluoride, and sodium polymethacrylate polystyrenesulfonate.

16. The electroluminescent device according to claim 14, wherein the electron-injection layer comprises a fluoride of an alkaline earth metal.

* * * * *